(12) United States Patent
Wu

(10) Patent No.: US 7,855,485 B2
(45) Date of Patent: Dec. 21, 2010

(54) AIR CORE STATOR INSTALLATION

(75) Inventor: Di Wu, Round Rock, TX (US)

(73) Assignee: TECO - Westinghouse Motor Company, Round Rock, TX (US)

(*) Notice: Subject to any disclaimer, the term of this patent is extended or adjusted under 35 U.S.C. 154(b) by 59 days.

(21) Appl. No.: 12/365,622

(22) Filed: Feb. 4, 2009

(65) Prior Publication Data

US 2010/0194233 A1    Aug. 5, 2010

(51) Int. Cl.
*H02K 1/00* (2006.01)

(52) U.S. Cl. .................................. 310/216.002

(58) Field of Classification Search .......... 310/216.001, 310/216.002, 216.009, 216.015, 257
See application file for complete search history.

(56) References Cited

U.S. PATENT DOCUMENTS

| | | | |
|---|---|---|---|
| 598,657 A | 2/1898 | Esson | 310/259 |
| 1,828,275 A | 10/1931 | Barnholdt | 210/258 |
| 4,137,471 A | 1/1979 | Sato et al. | 310/51 |
| 4,228,375 A | 10/1980 | Beermann et al. | 310/214 |
| 4,330,726 A | 5/1982 | Albright et al. | 310/254 |
| 4,352,034 A | 9/1982 | Karhan et al. | 310/59 |
| 4,356,419 A | 10/1982 | Boer et al. | 310/217 |
| 4,454,439 A | 6/1984 | Okamoto et al. | 310/179 |
| 4,475,052 A | 10/1984 | Okamoto et al. | 310/214 |
| 5,053,663 A | 10/1991 | Boer et al. | 310/91 |
| 6,285,107 B1 * | 9/2001 | Sawada et al. | 310/216.001 |
| 6,759,782 B2 | 7/2004 | Smith, Jr. | 310/218 |
| 6,879,075 B2 | 4/2005 | Calfo et al. | 310/156.01 |
| 6,879,081 B1 | 4/2005 | Howard et al. | 310/258 |
| 7,696,661 B2 * | 4/2010 | Holmes et al. | 310/112 |
| 2008/0093950 A1 | 4/2008 | Cros et al. | 310/257 |

FOREIGN PATENT DOCUMENTS

WO    WO 02/49190    6/2002

* cited by examiner

*Primary Examiner*—Nguyen N Hanh
(74) *Attorney, Agent, or Firm*—Fulbright & Jaworski

(57) ABSTRACT

Stator for use in an electrical machine. A non-magnetic support frame section and a non-magnetic coil support are used to provide an air gap stator configuration. The present stators provide an air gap winding configuration that facilitates the fixing of stator coils in the air gap, spaced apart from the magnetic back iron.

18 Claims, 5 Drawing Sheets

AIR CORE STATOR INSTALLATION

BACKGROUND

The present devices relate generally to the field of electrical machines, and more particularly to stators for use in electrical machines. The present stators provide an air gap winding configuration that facilitates the fixing of stator coils in the air gap, spaced apart from the magnetic back iron.

SUMMARY

Some embodiments of the present stators for use in an electrical machine include a plurality of magnetic back iron sections spaced apart from each other along a longitudinal axis of the stator, a plurality of non-magnetic support frame sections respectively disposed between the magnetic back iron sections, and a plurality of non-magnetic coil supports respectively disposed between the non-magnetic support frame sections such that the non-magnetic coil supports are not directly fixed to the magnetic back iron sections. The non-magnetic coil supports may each have a support body and a plurality of support teeth extending from the support body. The stator may be configured to support stator coils that are respectively disposed within slots defined using the support teeth. The slots may be spaced apart from the magnetic back iron sections.

In some embodiments, the non-magnetic support frame sections are respectively directly fixed to the magnetic back iron sections. In some embodiments, the non-magnetic coil supports are respectively directly fixed to the non-magnetic support frame sections. In some embodiments, the support body comprises cooling channels.

In some embodiments of the present stators, the support body comprises support holes, and the non-magnetic coil supports are configured to be respectively coupled to the non-magnetic support frame sections using support rods that interface with the support holes.

Some embodiments of the present stators for use in an electrical machine include magnetic back iron section, a non-magnetic first support frame section, a non-magnetic second support frame section, and a non-magnetic coil support disposed between the non-magnetic first support frame section and the non-magnetic second support frame section. The magnetic back iron section may have a first axial back iron face that is substantially parallel to a first plane that intersects a longitudinal axis of the stator, and a second axial back iron face that is substantially parallel to a second plane that intersects the longitudinal axis. The non-magnetic first support frame section may be located adjacent to the first axial back iron face. The non-magnetic second support frame section may be disposed adjacent to the second axial back iron face. The non-magnetic coil support may have a support body and a plurality of support teeth extending from the support body. The non-magnetic coil support may not be directly fixed to the magnetic back iron section. The stator may be configured to support stator coils that are respectively disposed within slots defined using the support teeth. The slots may be spaced apart from the magnetic back iron sections.

In some embodiments, the non-magnetic first support frame section is directly fixed to the first axial back iron face, and the non-magnetic second support frame section is directly fixed to the second axial back iron face.

In some embodiments, the non-magnetic coil support is directly fixed to the non-magnetic first support frame section and to the non-magnetic second support frame section.

In some embodiments, the support body includes support holes, and the non-magnetic coil support is configured to be coupled to the non-magnetic first support frame section and to the non-magnetic second support frame section using support rods that interface with the support holes.

In some embodiments of the present stators, the magnetic back iron section also includes an inner radial back iron face disposed between the first axial back iron face and the second axial back iron face. In some embodiments, the non-magnetic first support frame section may also have a first frame base face that faces the first axial back iron face, and a first radial support face that is substantially parallel to the inner radial back iron face. In some embodiments, the non-magnetic second support frame section may also have a second frame base face that faces the second axial back iron face, and a second radial support face that is substantially parallel to the inner radial back iron face.

In some embodiments, the first frame base face may be directly fixed to the first axial back iron face, the non-magnetic first support frame section may not be directly fixed to the inner radial back iron face, the second frame base face may directly fixed to the second axial back iron face, and the non-magnetic second support frame section may not be directly fixed to the inner radial back iron face.

Any embodiment of any of the present devices may consist of or consist essentially of-rather than comprise/include/contain/have-the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. Identical reference numerals do not necessarily indicate an identical structure, system, or display. Rather, the same reference numeral may be used to indicate a similar feature or a feature with similar functionality. Every feature of each embodiment is not always labeled in every figure in which that embodiment appears, in order to keep the figures clear.

FIG. 2 is a perspective view of a part of an embodiment of the present stators, viewed from plane 2-2 of FIG. 1. Portions of two back iron sections and related support frame sections, coil supports, and support rods are depicted. Some components are omitted for clarity.

FIG. 3 is a perspective view of the embodiment depicted in FIG. 2. Additional components are omitted to facilitate depiction of additional detail.

FIG. 4 is a perspective view of a part of another embodiment of the present stators. Portions of one back iron section and related support frame sections, coil supports, and non-cylindrical support rods are depicted. Some components are omitted for clarity.

FIG. 5 is a perspective view of another embodiment of the present stators. Cooling tubes are depicted. Additional components are omitted to facilitate depiction of additional detail.

DESCRIPTION OF ILLUSTRATIVE EMBODIMENTS

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, a device or system comprising certain elements includes at least the recited elements, but is not limited to only possessing the recited elements.

The terms "substantially," "about," and their variations are defined as being largely but not necessarily wholly what is specified as understood by one of ordinary skill in the art, and in one non-limiting embodiment, the substantially refers to ranges within 10%, preferably within 5%, more preferably within 1%, and most preferably within 0.5% of what is specified.

The terms "a" and "an" are defined as one or more than one, unless this application expressly requires otherwise. The term "another" is defined as at least a second or more.

Figure 1:
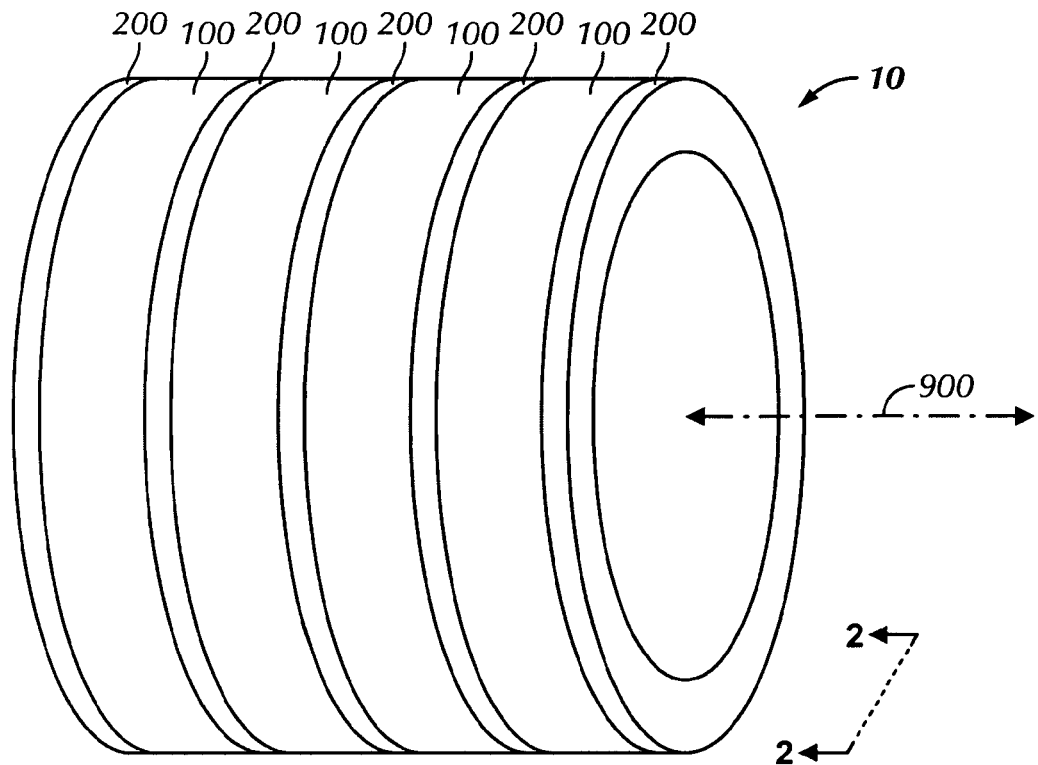
FIG. 1 depicts one embodiment of a present stator for use in an electrical machine.

An example of the present stators for use in electrical machines appears in perspective in FIG. 1. Stator 10 has longitudinal axis 900, and includes a plurality of magnetic back iron section 100 and non-magnetic support frame section 200 disposed along the direction of longitudinal axis 900. In the embodiment depicted, each non-magnetic support frame section 200 may be disposed between two magnetic back iron section 100, or may be disposed adjacent to only one magnetic back iron section 100 (e.g., non-magnetic support frame section 200 may be located at either end of the stator). In some embodiments, non-magnetic support frame section 200 may be disposed between two magnetic back iron section 100, but not be in contact with magnetic back iron section 100 (e.g., there may be other components between magnetic back iron section 100 and the nearest non-magnetic support frame section 200).

Figure 2:
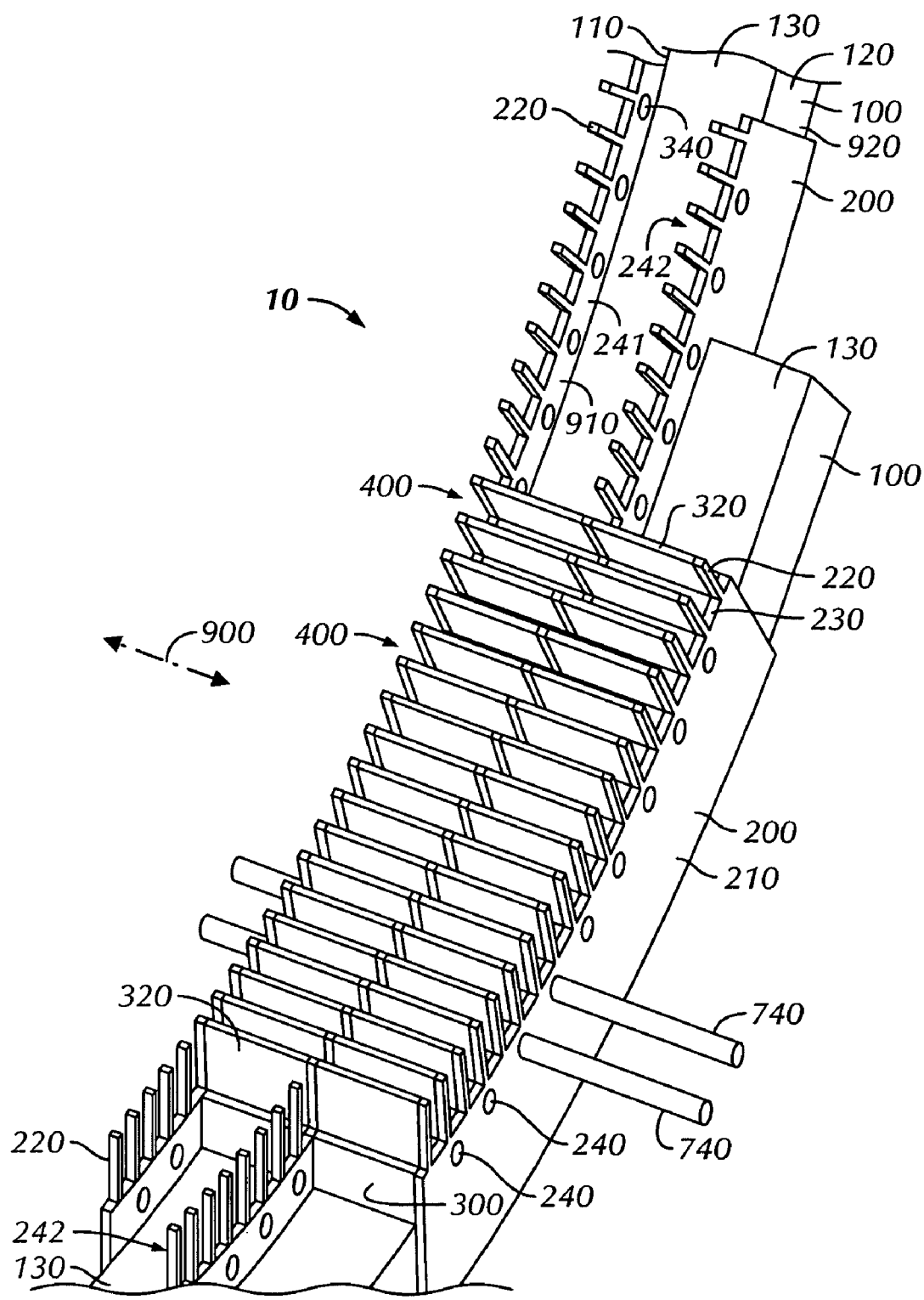
FIGS. 2-5 are drawn to scale, meaning the sizes of the depicted elements are accurate relative to each other.
Figure 3:
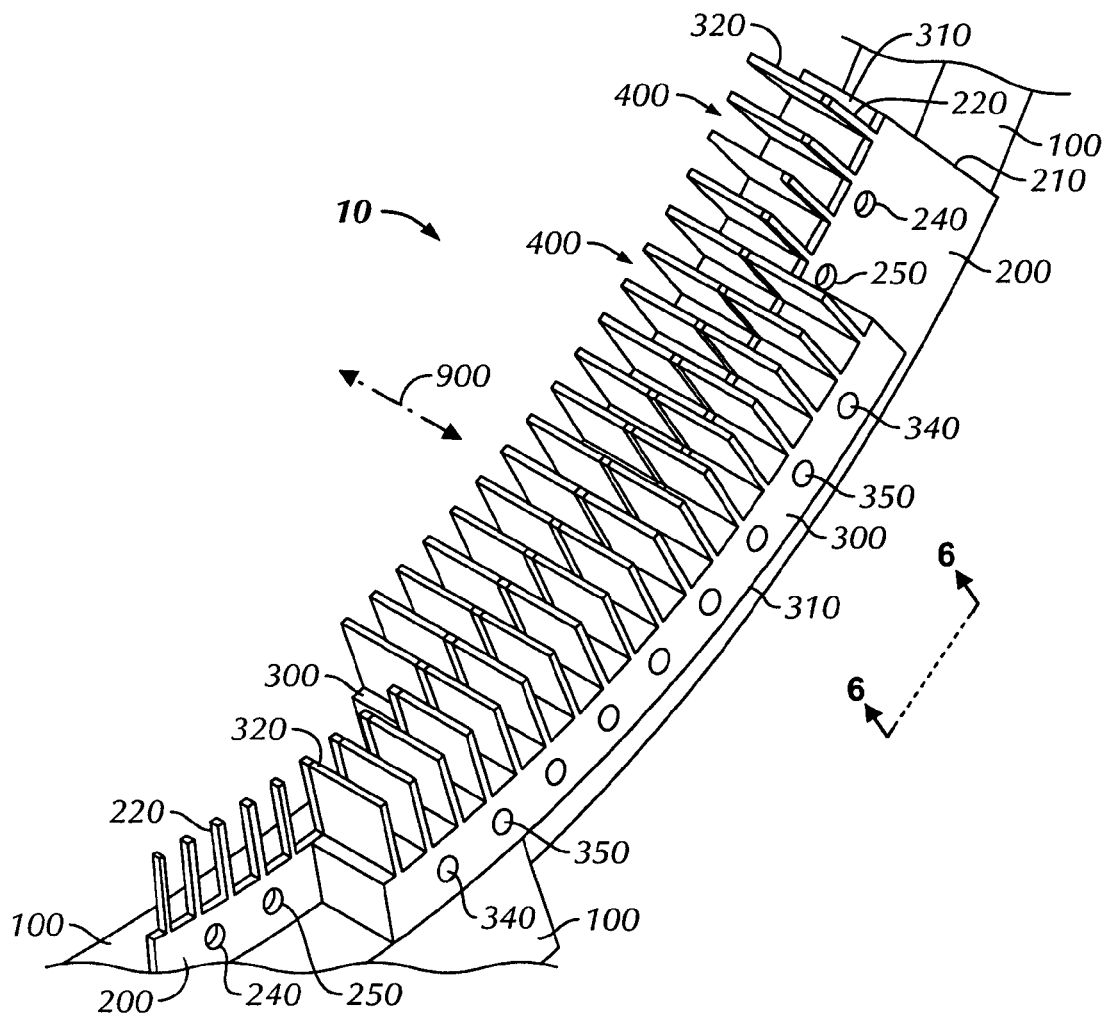

In some embodiments, magnetic back iron section 100 and non-magnetic support frame section 200 may be directly fixed to each other. Two objects may be "directly fixed" to each other by directly joining one or more surfaces of one object to one or more surfaces of the second object by means such as adhesive bonding, welding, soldering, or joining using surface features (e.g., interference fits, dovetail joints). Two objects may also be "directly fixed" to each other using fasteners that interface with the two objects to directly constrain the two objects relative to each other (e.g., threaded fasteners, rivets, pins). Two objects may be in contact and fixed relative to each other without being "directly fixed." For example, as depicted in FIG. 2, magnetic back iron section 100 may be directly fixed to non-magnetic support frame section 200 by virtue of, for example, magnetic back iron section 100 being welded to non-magnetic support frame section 200. Non-magnetic support frame section 200 may be directly fixed to non-magnetic coil support 300 by virtue of, for example, non-magnetic support frame section 200 being adhesively bonded to non-magnetic coil support 300. As a result, magnetic back iron section 100 and non-magnetic coil support 300 may be in contact, and may be fixed relative to each other. However, magnetic back iron section 100 and non-magnetic coil support 300 are not "directly fixed" to each other because there is no direct joining between surfaces of magnetic back iron section 100 and non-magnetic coil support 300, and there are no fasteners that interface with magnetic back iron section 100 and non-magnetic coil support 300 to constrain them relative to each other.

In some embodiments, magnetic back iron section 100 may be fixed to non-magnetic support frame section 200 by virtue of, for example, magnetic back iron section 100 and/or magnetic support frame section 200 being welded to core bars, or being installed using axially-aligned guiding pins.

Referring to FIGS. 2-5, magnetic back iron section 100 may have first axial back iron face 110, second axial back iron face 120, and inner radial back iron face 130. First axial back iron face 110 may be substantially parallel to first plane 910, and second axial back iron face 120 may be substantially parallel to second plane 920, where first plane 910 and second plane 920 each intersect longitudinal axis 900. Magnetic back iron section 100 may contain any suitable magnetic material, such as, for example, silicon steel, and may be configured to reduce AC losses (e.g., low conductivity, lamination construction in some embodiments). Stator 10 may comprise multiple magnetic back iron section 100 spaced apart from each other along the direction of longitudinal axis 900, with one or more non-magnetic support frame section 200 located between the multiple magnetic back iron section 100.

Non-magnetic support frame section 200 may include frame body 210 that has a frame base face (241 and/or 242). The frame base face may be substantially parallel to first plane 910 and/or second plane 920, and may face first axial back iron face 110 or second axial back iron face 120. In some embodiments, non-magnetic support frame section 200 may be directly fixed to magnetic back iron section 100, for example by directly joining first frame base face 241 and first axial back iron face 110, or by directly joining second frame base face 242 and second axial back iron face 120. In other embodiments, non-magnetic support frame section 200 and magnetic back iron section 100 may not be directly fixed to each other.

Non-magnetic support frame section 200 may also include radial support face 230 that is substantially parallel to inner radial back iron face 130. Some embodiments may also include a plurality of frame tooth 220 that extend from frame body 210. Non-magnetic support frame section 200 may contain any suitable non-magnetic material, such as, for example, stainless steel, phenolic materials, or suitable low-conductivity alloys.

Figure 4:
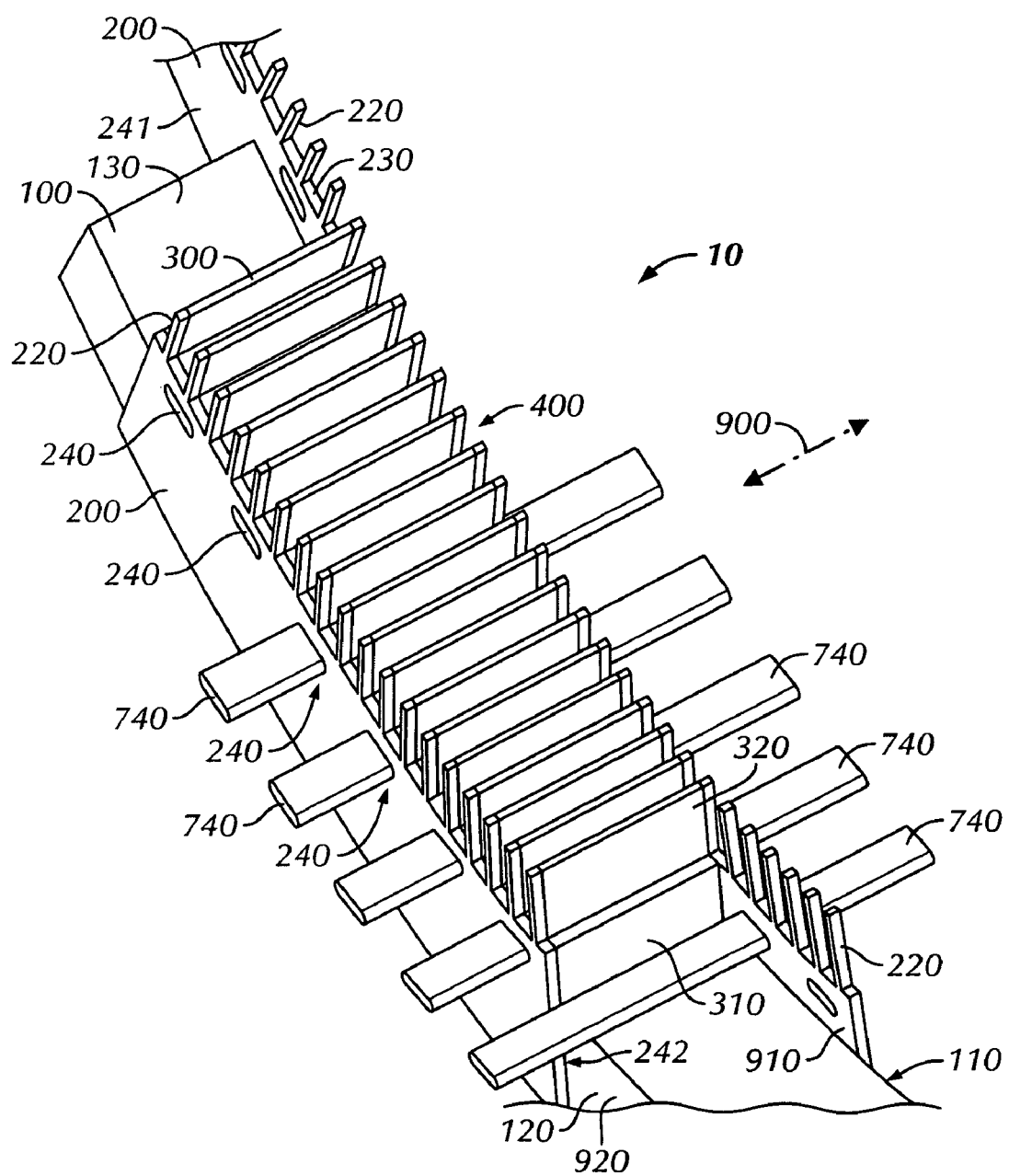

Embodiments of non-magnetic support frame section 200 may also include frame support hole 240 that is configured to facilitate the use of support rod 740 in fixing non-magnetic support frame section 200 to non-magnetic coil support 300. Frame support hole 240 and support rod 740 may be of any compatible cross-sectional shapes. For example, the embodiment depicted in FIGS. 2 and 3 include a circular frame support hole 240 configured to interface with a cylindrically-shaped support rod 740. FIG. 4 depicts an embodiment that uses frame support hole 240 that is an elongated slot configured to interface with support rod 740 having a similar cross-sectional shape. Support rod 740 may contain any suitable non-magnetic material, such as, for example, stainless steel, phenolic materials, or suitable low-conductivity alloys. In embodiments that are limited to low frequency operation (e.g. embodiments operating below about 10 Hz), suitable support rod 740 may contain suitable magnetic material (e.g., steel).

Figure 5:
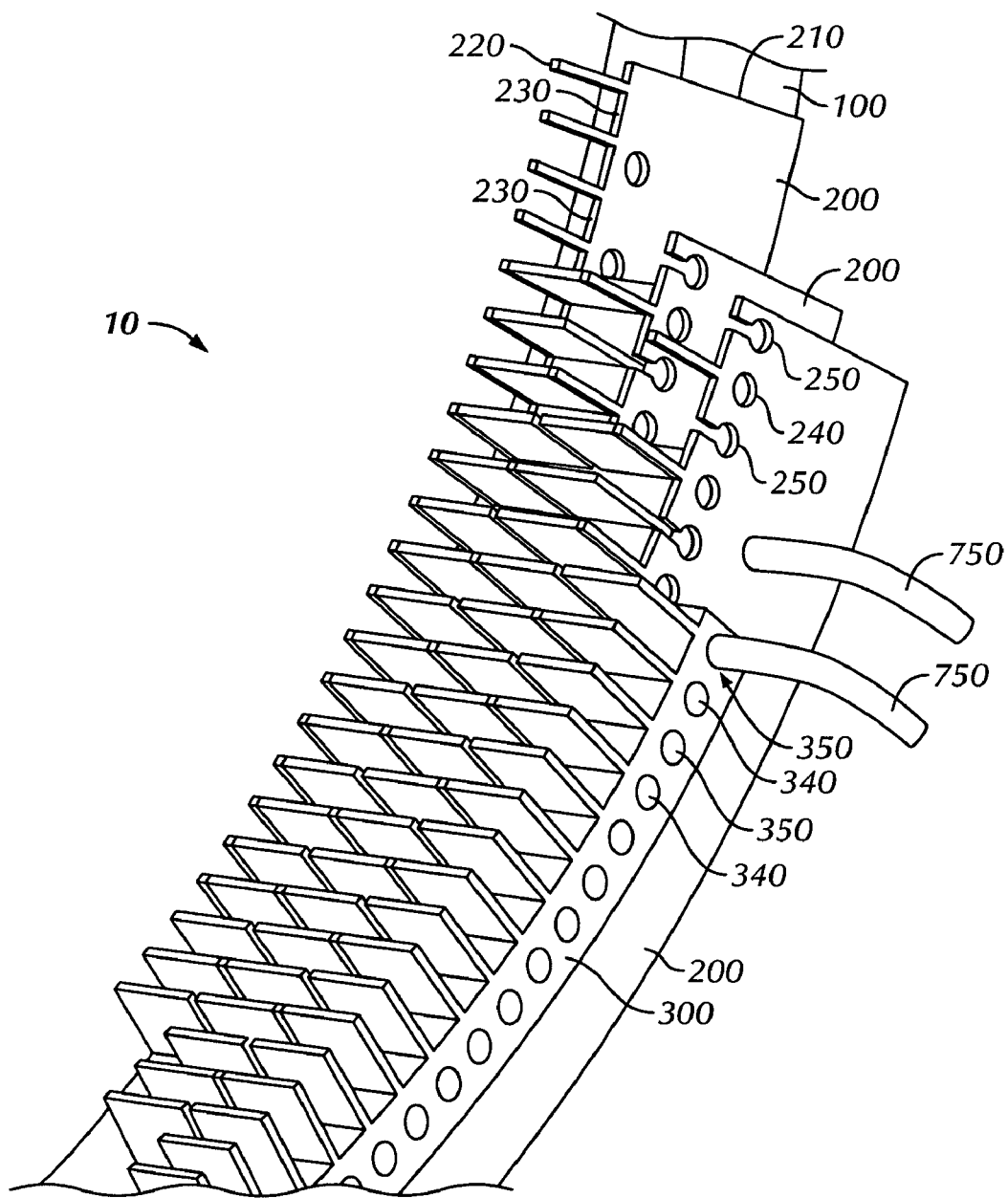

Some embodiments of non-magnetic support frame section 200 may include frame cooling channel 250 that is configured to facilitate cooling of stator 10. Referring to FIG. 5, cooling tube 750 is configured to interface with frame cooling channel 250. Cooling tube 750 may be configured to provide for the circulation of fluids that operate to remove heat from stator 10. Such fluids may include, for example, air, Hydrogen, water, or any other suitable cooling fluid. Cooling tube 750 and frame cooling channel 250 may be of any compatible cross-sectional shapes.

Figure 6:
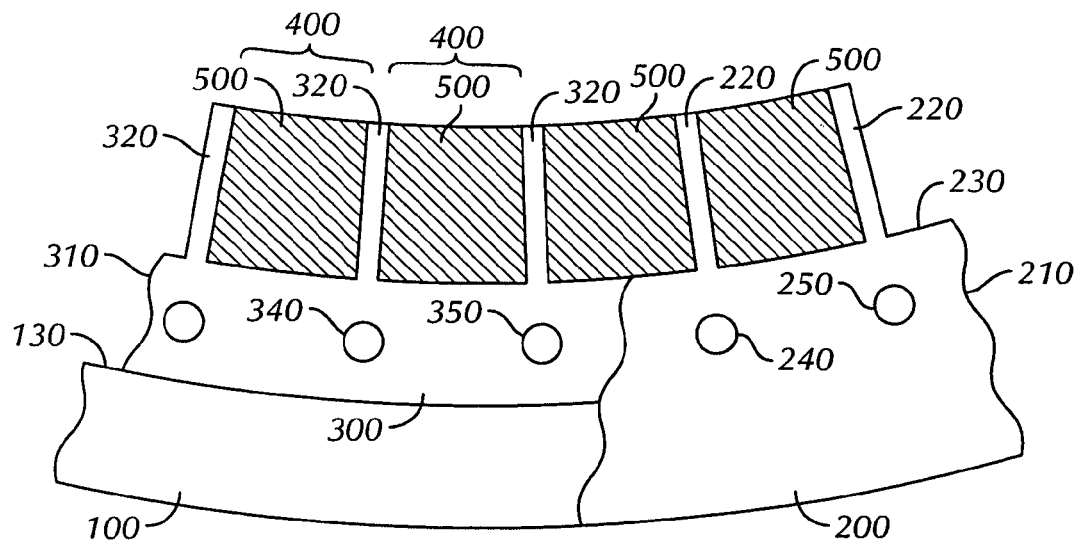
FIG. 6 is a axial view of the embodiments depicted in FIG. 3, viewed from plane 6-6. Stator coils, slots, back iron sections, support frame sections, coil support cooling channels, and frame cooling channels are depicted.

In some embodiments, both support rod 740 and cooling tube 750 may be employed. FIGS. 5 and 6 depict non-magnetic support frame section 200 that is configured with an alternating pattern of frame support hole 240 and frame cooling channel 250, configured to accommodate support rod 740 and cooling tube 750 respectively. Other embodiments may include frame support hole 240 and frame cooling channel 250 in other arrangements (e.g., vertically stacked, having a different alternating pattern frequency).

Referring again to FIGS. 2-5, stator 10 may include non-magnetic coil support 300 that is located between two non-magnetic support frame section 200. Non-magnetic coil support 300 may be adjacent and in contact with magnetic back iron section 100, but in some embodiments may not be directly fixed to magnetic back iron section 100. Non-magnetic coil support 300 may include support tooth 320 extending from support body 310. Support tooth 320 may be used to define slot 400, which is configured for supporting a stator coil. Additional supporting structure may be required in addition to support tooth 320 to fully constrain the stator coil. Non-magnetic coil support 300 may contain any suitable non-magnetic material, such as, for example, stainless steel, phenolic materials, or suitable low-conductivity alloys. Some embodiments may use lamination construction to reduce AC losses. The lamination construction may be use, for example, adhesive bonding, welding, soldering, joining using surface features, or pins.

Embodiments of stator 10 that include support rod 740 and/or cooling tube 750 may include non-magnetic coil support 300 having coil support hole 340 and/or coil support cooling channel 350, respectively. Coil support hole 340 may be of any shape that is compatible to the cross-sectional shape of support rod 740. Coil support cooling channel 350 may be of any shape that is compatible to the cross-sectional shape of cooling tube 750.

FIG. 6 depicts a detailed view of an embodiments of stator 10, viewed from the axial direction. Stator coil 500 are depicted within slot 400 that are each defined using support tooth 320 of non-magnetic coil support 300, thereby providing an air gap winding configuration that facilitates the fixing of stator coils in the air gap (e.g., spaced apart from magnetic back iron section 100 by the non-magnetic support body 310). Additional supporting structure may be employed to fully secure stator coil 500 within slot 400 (e.g., a radial cover, not shown).

Descriptions of well known assembly techniques, components, and equipment have been omitted so as not to unnecessarily obscure the present devices in unnecessary detail. The descriptions of the present devices are exemplary and non-limiting. Certain substitutions, modifications, additions and/or rearrangements falling within the scope of the claims, but not explicitly listed in this disclosure, may become apparent to those of ordinary skill in the art based on this disclosure. For example, additional supporting structure may be employed to fully secure stator coil 500 within slot 400. Some embodiments may include frame support hole 240, coil support hole 340, and support rod 740 that are of mutually compatible geometry, but that differ than the geometry of the embodiments depicted (for example, they may be rectangular, oval, or irregular in cross-sectional shape). Similarly, some embodiments may include frame support hole 240, coil support hole 340, and support rod 740 that are of mutually compatible geometry, but that differ than the geometry of the embodiments depicted. Furthermore, in some embodiments frame support hole 240 and coil support hole 340 may be used along with frame cooling channel 250 and coil support cooling channel 350, but may be arranged differently than depicted.

The appended claims are not to be interpreted as including means-plus-function limitations, unless such a limitation is explicitly recited in a given claim using the phrase(s) "means for" and/or "step for," respectively.

What is claimed is:

1. An stator for use in an electrical machine, the stator comprising
    a plurality of magnetic back iron sections spaced apart from each other along a longitudinal axis of the stator;
    a plurality of non-magnetic support frame sections respectively disposed between the magnetic back iron sections; and
    a plurality of non-magnetic coil supports respectively disposed between the non-magnetic support frame sections such that the non-magnetic coil supports are not directly fixed to the magnetic back iron sections, the non-magnetic coil supports each having a support body and a plurality of support teeth extending from the support body;
    where the stator is configured to support stator coils that are respectively disposed within slots defined using the support teeth, the slots being spaced apart from the plurality of magnetic back iron sections.

2. The stator of claim 1, where the non-magnetic support frame sections are respectively directly fixed to the magnetic back iron sections.

3. The stator of claim 1, where the non-magnetic coil supports are respectively directly fixed to the non-magnetic support frame sections.

4. The stator of claim 1, where the support body comprises cooling channels.

5. The stator of claim 1, where:
    the support body comprises support holes; and
    the non-magnetic coil supports are configured to be respectively coupled to the non-magnetic support frame sections using support rods that interface with the support holes.

6. The stator of claim 5, where the support body comprises cooling channels.

7. A stator for use in an electrical machine, the stator comprising
    a magnetic back iron section having:
        a first axial back iron face that is substantially parallel to a first plane that intersects a longitudinal axis of the stator; and
        a second axial back iron face that is substantially parallel to a second plane that intersects the longitudinal axis;
    a non-magnetic first support frame section disposed adjacent to the first axial back iron face;
    a non-magnetic second support frame section disposed adjacent to the second axial back iron face; and
    a non-magnetic coil support disposed between the non-magnetic first support frame section and the non-magnetic second support frame section, the non-magnetic coil support having:
        a support body; and
        a plurality of support teeth extending from the support body;
        where the non-magnetic coil support is not directly fixed to the magnetic back iron section;
    where the stator is configured to support stator coils that are respectively disposed within slots defined using the support teeth, the slots being spaced apart from the plurality of magnetic back iron sections.

8. The stator of claim 7, where the non-magnetic first support frame section is directly fixed to the first axial back iron face, and the non-magnetic second support frame section is directly fixed to the second axial back iron face.

9. The stator of claim 7, where the non-magnetic coil support is directly fixed to the non-magnetic first support frame section and to the non-magnetic second support frame section.

10. The stator of claim 7, where the support body comprises cooling channels.

11. The stator of claim 7, where:
the support body comprises support holes; and
the non-magnetic coil support is configured to be coupled to the non-magnetic first support frame section and to the non-magnetic second support frame section using support rods that interface with the support holes.

12. The stator of claim 11, where the support body comprises cooling channels.

13. An stator for use in an electrical machine, the stator comprising:
a magnetic back iron section having:
a first axial back iron face that is substantially parallel to a first plane that intersects a longitudinal axis of the stator;
second axial back iron face that is substantially parallel to a second plane that intersects the longitudinal axis; and
an inner radial back iron face disposed between the first axial back iron face and the second axial back iron face;
a non-magnetic first support frame section disposed adjacent to the first axial back iron face, the non-magnetic first support frame section having:
a first frame base face that faces the first axial back iron face; and
a first radial support face that is substantially parallel to the inner radial back iron face;
a non-magnetic second support frame section disposed adjacent to the second axial back iron face, the non-magnetic second support frame section having:
a second frame base face that faces the second axial back iron face; and
a second radial support face that is substantially parallel to the inner radial back iron face; and
a non-magnetic coil support disposed between the non-magnetic first support frame section and the non-magnetic second support frame section, the non-magnetic coil support having:
a support body; and
a plurality of support teeth extending from the support body;
where the non-magnetic coil support is not directly fixed to the magnetic back iron section; and
where the stator is configured for supporting stator coils that are respectively disposed within slots defined using the support teeth, the slots being spaced apart from the magnetic back iron section.

14. The stator of claim 13, where:
the first frame base face is directly fixed to the first axial back iron face;
the non-magnetic first support frame section is not directly fixed to the inner radial back iron face;
the second frame base face is directly fixed to the second axial back iron face; and
the non-magnetic second support frame section is not directly fixed to the inner radial back iron face.

15. The stator of claim 13, where the non-magnetic coil support is directly fixed to the non-magnetic first support frame section and to the non-magnetic second support frame section.

16. The stator of claim 13, where the support body comprises cooling channels.

17. The stator of claim 13, where:
the support body comprises support holes; and
the non-magnetic coil support is configured to be coupled to the non-magnetic first support frame section and to the non-magnetic second support frame section using support rods that interface with the support holes.

18. The stator of claim 17, where the support body comprises cooling channels.

* * * * *